United States Patent
Wei (10) Patent No.: US 8,760,773 B2
(45) Date of Patent: Jun. 24, 2014

(54) ZOOM LENS

(71) Applicant: Tamron Co., Ltd., Saitama (JP)

(72) Inventor: Lai Wei, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 13/760,534

(22) Filed: Feb. 6, 2013

(65) Prior Publication Data

US 2013/0222921 A1 Aug. 29, 2013

(30) Foreign Application Priority Data

Feb. 28, 2012 (JP) ................. 2012-042553

(51) Int. Cl.
*G02B 15/14* (2006.01)
(52) U.S. Cl.
USPC ........... 359/683; 359/684; 359/685; 359/686; 359/687; 359/714; 359/740; 359/763; 359/764
(58) Field of Classification Search
USPC .............. 359/683–687, 714, 740, 763, 764
See application file for complete search history.

(56) References Cited

U.S. PATENT DOCUMENTS

| | | | | |
|---|---|---|---|---|
| 7,116,489 B2* | 10/2006 | Ohtake | ............ | 359/687 |
| 7,209,299 B2* | 4/2007 | Aoki | ............ | 359/683 |
| 7,218,458 B2* | 5/2007 | Saruwatari | ............ | 359/686 |
| 7,227,699 B2* | 6/2007 | Hamano et al. | ............ | 359/687 |
| 7,315,424 B2* | 1/2008 | Saruwatari | ............ | 359/687 |
| 2009/0086334 A1* | 4/2009 | Take | ............ | 359/683 |
| 2009/0116120 A1* | 5/2009 | Saruwatari | ............ | 359/686 |
| 2009/0119121 A1* | 5/2009 | Kang et al. | ............ | 705/1 |
| 2009/0122418 A1* | 5/2009 | Atsuumi et al. | ............ | 359/684 |
| 2009/0168196 A1* | 7/2009 | Kimura | ............ | 359/687 |
| 2011/0019033 A1* | 1/2011 | Ori et al. | ............ | 359/683 |

FOREIGN PATENT DOCUMENTS

| | | | |
|---|---|---|---|
| JP | 4542933 B2 | 9/2010 | |
| JP | 4672860 B2 | 4/2011 | |
| JP | 4823680 B2 | 11/2011 | |
| JP | 4823684 B2 | 11/2011 | |

* cited by examiner

*Primary Examiner* — Evelyn A. Lester
(74) *Attorney, Agent, or Firm* — Foley & Lardner LLP (57) ABSTRACT

A zoom lens includes sequentially from an object side, a first lens group having a positive refractive power, a second lens group having a negative refractive power, a third lens group having a positive refractive power, a fourth lens group having a positive refractive power, and a fifth lens group having a negative refractive power. The zoom lens satisfies given conditions to implement a compact, wide angle, large aperture ratio zoom lens having excellent optical performance and compatible with solid state image sensors capable of recording full high vision images.

5 Claims, 8 Drawing Sheets

FIRST EMBODIMENT
(WIDE ANGLE EDGE)

SPHERICAL ABERRATION
Fno. /1.6

ASTIGMATISM
ω=38.03°

ASTIGMATISM
ω=38.03°

(INTERMEDIATE FOCAL POSITION)

SPHERICAL ABERRATION
Fno. /3.8

ASTIGMATISM
ω=7.10°

ASTIGMATISM
ω=7.10°

(TELEPHOTO EDGE)

SPHERICAL ABERRATION
Fno. /4.9

ASTIGMATISM
ω=1.32°

ASTIGMATISM
ω=1.32°

SECOND EMBODIMENT
(WIDE ANGLE EDGE)
SPHERICAL ABERRATION
Fno. /1.6

ASTIGMATISM
ω=38.09°

ASTIGMATISM
ω=38.09°

(INTERMEDIATE FOCAL POSITION)
SPHERICAL ABERRATION
Fno. /3.8

ASTIGMATISM
ω=7.07°

ASTIGMATISM
ω=7.07°

(TELEPHOTO EDGE)
SPHERICAL ABERRATION
Fno. /4.9

ASTIGMATISM
ω=1.32°

ASTIGMATISM
ω=1.32°

FIG.6

THIRD EMBODIMENT
(WIDE ANGLE EDGE)

(INTERMEDIATE FOCAL POSITION)

(TELEPHOTO EDGE)

FIG.8

ZOOM LENS

BACKGROUND OF THE INVENTION

1. Field of the Invention

The present invention relates to a zoom lens suitable for an imaging apparatus equipped with a solid state image sensor, such as digital still camera and a digital video camera.

2. Description of the Related Art

Zoom lenses that are configured by 4 lens groups, capable of high zoom ratios, and used as imaging lens on digital still cameras and digital video cameras equipped with a solid state image sensor such as such as a charge-coupled device (CCD) and a complementary metal-oxide-semiconductor (CMOS) are commonly known (see, for example, Japanese Patent No. 4672860).

The zoom lens recited in Japanese Patent No. 4672860 includes sequentially from a side nearest an object (object side), first to fourth lens groups respectively having a positive, negative, positive, and positive refractive powers. In the zoom lens, the first and third lens groups are stationary, while the second lens group is moved in one direction to perform zooming and the fourth lens group is moved in a back and forth direction to correct image plane variation accompanying zooming and to perform focusing. The zoom ratio of the zoom lens is on the order of 25×; and the maximum angle of view is on the order of 58 degrees. With such a zoom lens formed by 4 lens groups, since there are 2 movable groups, configuration of the lens barrel can be simplified and the size of the lens system overall can be reduced.

A zoom lens that incorporates a stationary fifth lens group into the 4 lens group configuration above is further known (see, for example, Japanese Patent Nos. 4542933, 4823680, and 4823684). The zoom lenses recited in Japanese Patent Nos. 4542933, 4823680, and 4823684 each include from the object side, first to fifth lens groups respectively having a positive, negative, positive, positive, and negative refractive power. In the zoom lenses, the first, third, and fifth lens groups are stationary, while the second lens group is moved in one direction to perform zooming and the fourth lens group is moved in a back and forth direction to correct image plane variation accompanying zooming and to perform focusing.

The zoom ratio of the zoom lens recited in Japanese Patent No. 4542933 is on the order of 30×; and the maximum angle of view is on the order of 60 degrees. The zoom ratio of the zoom lens recited in Japanese Patent No. 4823680 is on the order of 35×; and the maximum angle of view is on the order of 73 degrees. The zoom ratio of the zoom lens recited in Japanese Patent No. 4823684 is on the order of 14×; and the maximum angle of view is on the order of 70 degrees.

Nonetheless, in addition to favorably correcting various types of aberration over the entire zoom range, large aperture ratios for wide angle views enabling the recording of images at dimly lit locations over a wider range are demanded of lens systems for surveillance cameras. Furthermore, accompanying the increased prevalence of solid state image sensors capable of full high vision image recording, lens systems compatible with full high vision solid state image sensors are demanded. Conventionally, demand has increased for a lens system for a surveillance camera equipped with a full high vision solid state image sensor to have extremely high optical performance capable of favorably correcting various types of aberration over the entire zoom range.

As conventional technologies, the zoom lenses above have difficulty in maintaining high optical performance in addition to achieving greater aperture ratios and a compact size. In other words, problems arise in attempting to realize wide angle views and greater aperture ratios, including a sacrifice of compactness, difficulty in correcting various types of aberration over the entire zoom range, and an inability to record full high vision images.

For example, with the conventional technologies, if the angle of view is to be increased, the front lens diameter has to be increased and the correction of coma and astigmatism at the wide angle edge becomes difficult. Furthermore, if the zoom ratio and resolution are to be increased, the overall length of the lens system increases or chromatic aberration at the telephoto edge becomes prominent and optical performance markedly deteriorates. In particular, if greater aperture ratios are to be realized, the correction of image plane curvature from the wide angle edge to the telephoto edge becomes difficult and high performance over the entire zoom range cannot be maintained.

SUMMARY OF THE INVENTION

It is an object of the present invention to at least solve the above problems in the conventional technologies.

A zoom lens according to one aspect of the present invention includes sequentially from an object side, a first lens group having a positive refractive power, a second lens group having a negative refractive power, a third lens group having a positive refractive power, a fourth lens group having a positive refractive power, and a fifth lens group having a negative refractive power. The first lens group, the third lens group, and the fifth lens group remain stationary. The second lens group is moved along an optical axis, from the object side toward an image side, whereby zooming from a wide angle edge to a telephoto edge is performed. The fourth lens group is moved along the optical axis, whereby image plane variation accompanying zooming is corrected and focusing is performed. The second lens group includes sequentially from the object side, a first lens that is a negative meniscus lens having a convex surface on the object side and having at least one aspheric surface, a negative second lens, a positive third lens, and a negative fourth lens. The zoom lens satisfies a conditional expression (1) $1.5<|f21/FW|<2.5$, and a conditional expression (2) $0.5<|rp/f21|<0.8$, where, f21 is a focal length of the first lens in the second lens group, FW is a focal length of the entire optical system at the wide angle edge, and rp is a radius of curvature of a surface on the image side of the first lens of the second lens group.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Preferred embodiments of a zoom lens according to the present invention are explained in detail with reference to the accompanying drawings.

The zoom lens according to the present invention includes sequentially from the object side, a first lens group having a positive refractive power, a second lens group having a negative refractive power, a third lens group having a positive refractive power, a fourth lens group having a positive refractive power, and a fifth lens group having a negative refractive power. The second lens group is moved along an optical axis, whereby zooming is performed from the wide angle edge to the telephoto edge. The fourth lens group is moved along the optical axis whereby image plane variation accompanying zooming is corrected and focusing is performed. The first lens group, the third lens group, and the fifth lens group remain stationary (the configuration above is referred to as a basic configuration).

An object of the present invention is to provide a high zoom ratio zoom lens that is compact and capable of wide angle views and that has a large aperture ratio and excellent optical performance, e.g., a zoom lens that is optimal for a compact imaging apparatus equipped with a solid state image sensor capable of recording images in full high vision. To achieve such an object, various conditions are set as indicated below.

In addition to the basic configuration, in the zoom lens according to the present invention, the second lens group includes sequentially from the object side, a negative first ions that is a meniscus lens having a convex surface on the object side and having at least one aspheric surface, a negative second lens, a positive third lens, and a negative fourth lens. By forming an aspheric surface on the first lens disposed farthest on the object side of the second lens group, coma, astigmatism, and image plane curvature accompanying wide angle views and large aperture ratios can be easily corrected.

To favorably correct various types of aberration occurring with size reductions, wide angle views, and high zoom ratios, the zoom lens according to the present invention preferably satisfies the conditional expressions below, where f21 is the focal length of the first lens in the second lens group; FW is the focal length of the entire optical system at the wide angle edge; and rp is the radius of curvature of the surface on an image side (side nearest an image plane) of the first lens of the second lens group.

$$1.5 < |f21/FW| < 2.5 \quad (1)$$

$$0.5 < |rp/f21| < 0.8 \quad (2)$$

Conditional expression (1) prescribes a proper range of the ratio of the focal length f21 of the first lens disposed farthest on the object side of the second lens group and the focal length FW of the entire optical system at the wide angle edge. Below the lower limit of conditional expression (1), the refractive power of the first lens in the second lens group becomes too strong. Although a stronger refractive power is advantageous in reducing the size of the optical system and in achieving wide angle views, the correction of various types of aberration becomes difficult. Above the upper limit of conditional expression (1), the refractive power of the first lens in the second lens group becomes too weak. Although a weaker refractive power is advantageous in correcting various types of aberration, reductions in the size of the optical system and wide angle views become difficult.

More favorable results can be expected if the zoom lens satisfies conditional expression (1) within the range indicated below.

$$1.8 < |f21/FW| < 2.3 \quad (1a)$$

By satisfying conditional expression (1) within the range prescribed by conditional expression (1a), the zoom lens can achieve size reductions, wide angle views, and aberration correction with a better balance.

Conditional expression (2) prescribes the shape of the surface on the image side of the first lens that is in the second lens group and has a concave surface of a large curvature. By forming the surface on the image side of the first lens group to have a curvature within the range satisfying conditional expression (2), the surface on the image side of the first lens can be formed to be concentric with the entrance pupil and the occurrence of various types of aberration can be suppressed.

Below the lower limit of conditional expression (2), the radius of curvature of the surface on the image side of the first lens in the second lens group becomes too small, making processing difficult. Meanwhile, above the upper limit of conditional expression (2), although processing of the first lens becomes easy, concentricity with the entrance pupil is lost and the correction of various types of aberration becomes difficult.

In the zoom lens according to the present invention, to perform favorable correction of chromatic aberration (axial chromatic aberration, chromatic difference of magnification), the third lens and the fourth lens in the second lens group are cemented. In addition, the zoom lens preferably satisfies the conditional expression below, where υd23 is Abbe number (with respect to the d-line) of the third lens of the second lens group.

$$υd23 < 20 \quad (3)$$

By satisfying conditional expression (3), the zoom lens can correct chromatic aberration caused by the second lens group as a whole since in the second lens group, the positive third lens causes chromatic aberration in a direction opposite to that of the chromatic aberration (axial chromatic aberration, chromatic difference of magnification) caused by the negative first and second lenses. Above the upper limit of conditional expression (2), chromatic aberration sufficient for performing correction cannot be caused at the third lens and as a result, the chromatic aberration caused by the second lens group as a whole increases.

In the zoom lens according to the present invention, the first lens group includes sequentially from the object side, a negative first lens, a positive second lens, a positive third lens, and a positive fourth lens. In the configuration, to favorably correct chromatic aberration at the telephoto edge of the optical system, the first lens and second lens in the first lens group are cemented. In addition, the zoom lens preferably satisfies the following conditional expression, where υd12 is the Abbe number (with respect to the d-line) of the second lens in the first lens group, and υd13 is the Abbe number (with respect to the d-line) of the third lens in the first lens group.

$$υd12 > 75 \quad (4)$$

$$υd13 > 63 \quad (5)$$

Conditional expressions (4) and (5) express conditions necessary to favorably correct chromatic aberration occurring at the telephoto edge of the optical system. Below the lower limit of either conditional expression (4) or conditional expression (5), chromatic aberration occurring at the telephoto edge of the optical system cannot be corrected.

In the zoom lens according to the present invention, the third lens group preferably includes sequentially from the object side, a positive first lens having at least one aspheric surface, and a negative second lens that is a meniscus lens having a convex surface on the object side. Configuration of the third lens group in this manner enables spherical aberration and coma occurring over the entire zoom range to be favorably corrected.

As described, the zoom lens according to the present invention, by having the configuration described above, achieves size reductions, wide angle views, a large aperture ratio and a high zoom ratio, favorably corrects various types of aberration over the entire zoom range, and is compatible with full high vision solid state image sensors. In particular, by satisfying the conditional expressions above, the zoom lens can achieve size reductions, wide angle views, a large aperture ratio and a high zoom ratio, while maintaining high optical performance.

With reference to the accompanying drawings, embodiments of the zoom lens according to the present invention will be described in detail. Nonetheless, the present invention is not limited by the embodiments below.

Figure 1:
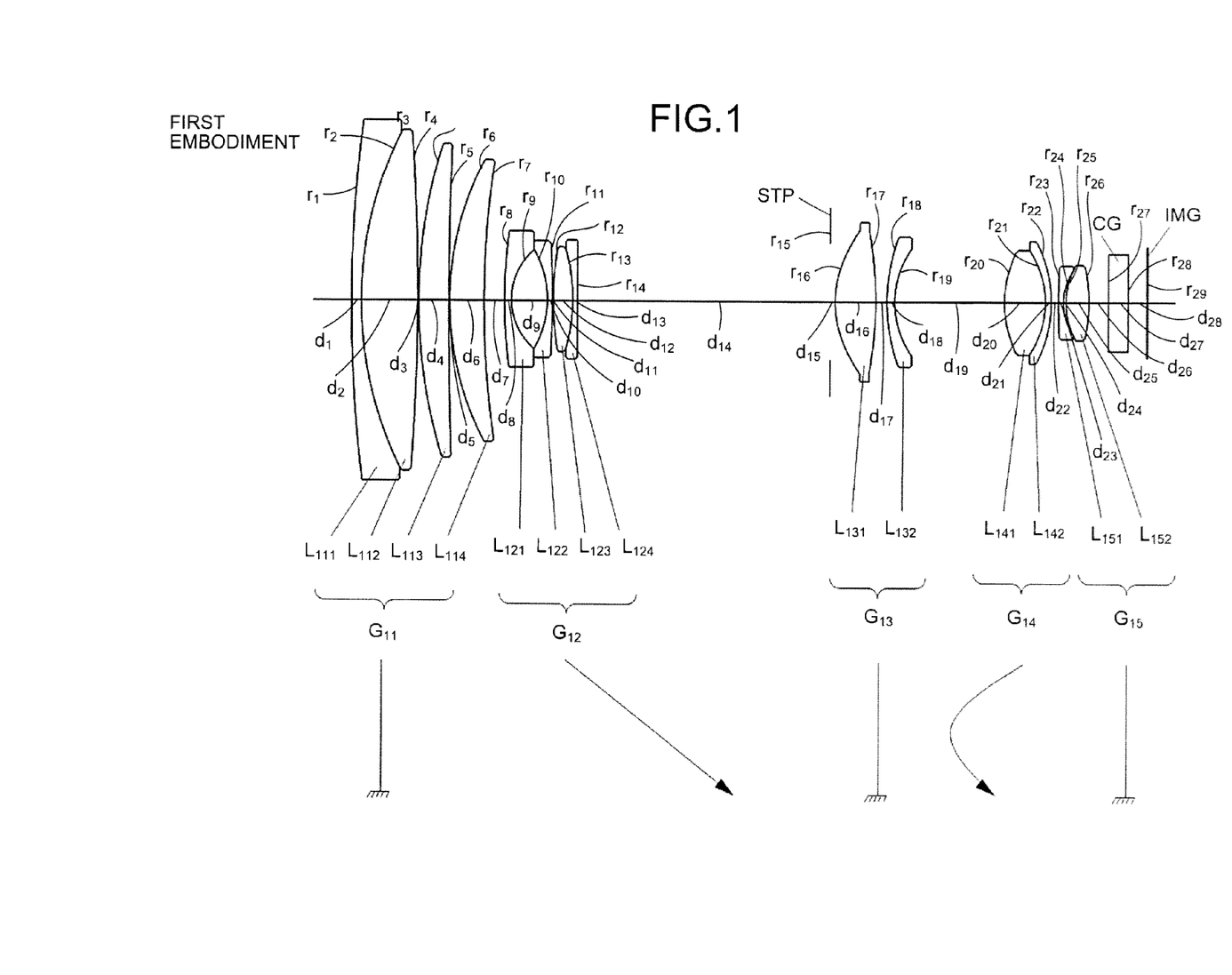
FIG. 1 is a cross sectional view (along the optical axis) of a zoom lens according to a first embodiment.

FIG. 1 is a cross sectional view (along the optical axis) of the zoom lens according to a first embodiment. The zoom lens includes sequentially from a side nearest a non-depicted object (the object side), a first lens group $G_{11}$ having a positive refractive power, a second lens group $G_{12}$ having a negative refractive power, a third lens group $G_{13}$ having a positive refractive power, a fourth lens group $G_{14}$ having a positive refractive power, and a fifth lens group $G_{15}$ having a negative refractive power.

An aperture stop STP prescribing a given aperture is disposed between the second lens group $G_{12}$ and the third lens group $G_{13}$. A cover glass CG is disposed between the fifth lens group $G_{15}$ and an imaging plane IMG. The cover glass CG is disposed as necessary and may be omitted accordingly. At the image plane IMG, the light receiving surface of a solid state image sensor, such as a CCD and CMOS, is disposed.

The first lens group $G_{11}$ includes sequentially from the object side, a negative first lens $L_{111}$, a positive second lens $L_{112}$, a positive third lens $L_{113}$, and a positive fourth lens $L_{114}$. The first lens $L_{111}$ and the second lens $L_{112}$ are cemented.

The second lens group $G_2$ includes sequentially from the object side, a negative first lens $L_{121}$, a negative second lens $L_{122}$, a positive third lens $L_{123}$, and a negative fourth lens $L_{124}$. The first lens $L_{121}$ is a meniscus lens having a convex surface on the object side and both surfaces of the first lens $L_{121}$ are aspheric. The third lens $L_{123}$ and the fourth lens $L_{124}$ are cemented.

The third lens group $G_{13}$ includes sequentially from the object side, a positive first lens $L_{131}$ and a negative second lens $L_{132}$. Both surfaces of the first lens $L_{131}$ are aspheric. The second lens $L_{132}$ is a meniscus lens having a convex surface on the object side.

The fourth lens group $G_{14}$ includes sequentially from the object side, a positive first lens $L_{141}$ and a negative second lens $L_{142}$. The surface on the object side of the first lens $L_{141}$ is aspheric. The first lens $L_{141}$ and the second lens $L_{142}$ are cemented.

The fifth lens group $G_{15}$ includes sequentially from the object side, a negative first lens $L_{151}$ and a positive second lens $L_{152}$. Both surfaces of the first lens $L_{151}$ are aspheric.

The second lens group $G_{12}$ is moved along the optical axis from the object side toward the imaging plane IMG side, whereby the zoom lens zooms from the wide angle edge to the telephoto edge. The fourth lens group $G_{14}$ is moved along the optical axis, whereby the zoom lens corrects image plane variations accompanying zooming and performs focusing. The first lens group $G_{11}$, the third lens group $G_{13}$, and the fifth lens group $G_{15}$ remain stationary.

Here, various values related to the zoom lens according to the first embodiment are given.

---

Focal length of entire lens system = 4.3 (FW: wide angle edge) to 24.0 (intermediate focal position) to 129.0 (telephoto edge)
F number = 1.6 (wide angle edge) to 3.8 (intermediate focal position) to 4.9 (telephoto edge)
Half-angle (ω) = 38.03 (wide angle edge) to 7.10 (intermediate focal position) to 1.32 (telephoto edge)
(Lens Data)

| | | | |
|---|---|---|---|
| $r_1 = 155.252$ | $d_1 = 1.00$ | $nd_1 = 1.84666$ | $vd_1 = 23.78$ |
| $r_2 = 40.511$ | $d_2 = 5.75$ | $nd_2 = 1.49700$ | $vd_2 = 81.60$ |
| $r_3 = -245.543$ | $d_3 = 0.10$ | | |
| $r_4 = 55.154$ | $d_4 = 3.20$ | $nd_3 = 1.59282$ | $vd_3 = 68.63$ |
| $r_5 = 382.377$ | $d_5 = 0.10$ | | |
| $r_6 = 31.841$ | $d_6 = 3.50$ | $nd_4 = 1.83481$ | $vd_4 = 42.72$ |
| $r_7 = 95.333$ | $d_7 = D(7)$ | (variable) | |
| $r_8 = 73.450$ (aspheric) | $d_8 = 0.70$ | $nd_5 = 1.85135$ | $vd_5 = 40.10$ |
| $r_9 = 6.869$ (aspheric) | $d_9 = 3.52$ | | |
| $r_{10} = -11.337$ | $d_{10} = 0.50$ | $nd_6 = 1.88300$ | $vd_6 = 40.80$ |
| $r_{11} = 339.750$ | $d_{11} = 0.10$ | | |
| $r_{12} = 23.770$ | $d_{12} = 2.00$ | $nd_7 = 1.95906$ | $vd_7 = 17.47$ |
| $r_{13} = -24.162$ | $d_{13} = 0.50$ | $nd_8 = 1.88300$ | $vd_8 = 40.80$ |
| $r_{14} = 104.181$ | $d_{14} = D(14)$ | (variable) | |
| $r_{15} = \infty$ (aperture stop) | $d_{15} = 0.50$ | | |
| $r_{16} = 11.539$ (aspheric) | $d_{16} = 4.20$ | $nd_9 = 1.61881$ | $vd_9 = 63.85$ |
| $r_{17} = -30.000$ (aspheric) | $d_{17} = 0.10$ | | |
| $r_{18} = 19.101$ | $d_{18} = 0.80$ | $nd_{10} = 2.001$ | $vd_{10} = 29.13$ |
| $r_{19} = 10.836$ | $d_{19} = D(19)$ | (variable) | |
| $r_{20} = 12.791$ (aspheric) | $d_{20} = 4.20$ | $nd_{11} = 1.4971$ | $vd_{11} = 81.56$ |
| $r_{21} = -9.500$ | $d_{21} = 0.60$ | $nd_{12} = 1.90366$ | $vd_{12} = 31.31$ |
| $r_{22} = -14.070$ | $d_{22} = D(22)$ | (variable) | |
| $r_{23} = 28.595$ (aspheric) | $d_{23} = 0.50$ | $nd_{13} = 1.85135$ | $vd_{13} = 40.10$ |
| $r_{24} = 5.300$ (aspheric) | $d_{24} = 0.30$ | | |
| $r_{25} = 7.909$ | $d_{25} = 2.26$ | $nd_{14} = 1.56732$ | $vd_{14} = 42.80$ |
| $r_{26} = -16.411$ | $d_{26} = 1.00$ | | |
| $r_{27} = \infty$ | $d_{27} = 2.00$ | $nd_{15} = 1.51633$ | $vd_{15} = 64.14$ |
| $r_{28} = \infty$ | $d_{28} = 3.50$ | | |
| $r_{29} = \infty$ (imaging plane) | | | |

Constants of the cone (k) and aspheric coefficients (A, B, C, D)

(eighth plane)

$k = 0$,
$A = -4.57687 \times 10^{-5}$, $B = 6.79061 \times 10^{-6}$,
$C = -2.31578 \times 10^{-7}$, $D = 2.42224 \times 10^{-9}$ (ninth plane)

$k = 0.5967$,
$A = -3.17031 \times 10^{-4}$, $B = -4.17155 \times 10^{-6}$,
$C = 5.67706 \times 10^{-7}$, $D = -3.92278 \times 10^{-8}$ (sixteenth plane)

$k = -0.1306$,
$A = -4.08183 \times 10^{-5}$, $B = -1.15089 \times 10^{-6}$,
$C = 1.15662 \times 10^{-8}$, $D = -6.70182 \times 10^{-11}$ (seventeenth plane)

$k = -8.2910$,
$A = 7.81968 \times 10^{-5}$, $B = -1.89538 \times 10^{-6}$,
$C = 2.76889 \times 10^{-8}$, $D = -1.55839 \times 10^{-10}$ (twentieth plane)

$k = -0.1487$,
$A = -4.90625 \times 10^{-5}$, $B = -1.02186 \times 10^{-6}$,
$C = 5.04342 \times 10^{-10}$, $D = 4.85594 \times 10^{-10}$ -continued (twenty-third plane)

k = 0,
A = −4.98290 × 10$^{-4}$, B = −1.45444 × 10$^{-5}$,
C = 3.32964 × 10$^{-6}$, D = −1.57350 × 10$^{-7}$
(twenty-fourth plane)

k = −0.1993,
A = −4.77089 × 10$^{-4}$, B = −3.50309 × 10$^{-5}$,
C = 3.89261 × 10$^{-6}$, D = −2.07190 × 10$^{-7}$ (Zoom Data)

|  | wide angle edge | intermediate focal position | telephoto edge |
|---|---|---|---|
| D(7) | 0.719 | 19.460 | 27.823 |
| D(14) | 28.930 | 10.189 | 1.825 |
| D(19) | 10.283 | 4.604 | 14.356 |
| D(22) | 4.687 | 10.366 | 0.614 |

(Values related to conditional expression (1))
f21 (focal length of first lens $L_{121}$) = −8.944
|f21/FW| = 2.08
(Values related to conditional expression (2))
rp (radius of curvature of surface on image side of first lens $L_{121}$) = 6.869
|rp/f21| = 0.768
(Values related to conditional expression (3))
υd23 (Abbe number of third lens $L_{123}$, with respect to d-line) = 17.47
(Values related to conditional expression (4))
υd12 (Abbe number of second lens $L_{112}$, with respect to d-line) = 81.60
(Values related to conditional expression (5))
υd13 (Abbe number of third lens $L_{113}$, with respect to d-line) = 68.63

Figure 2:
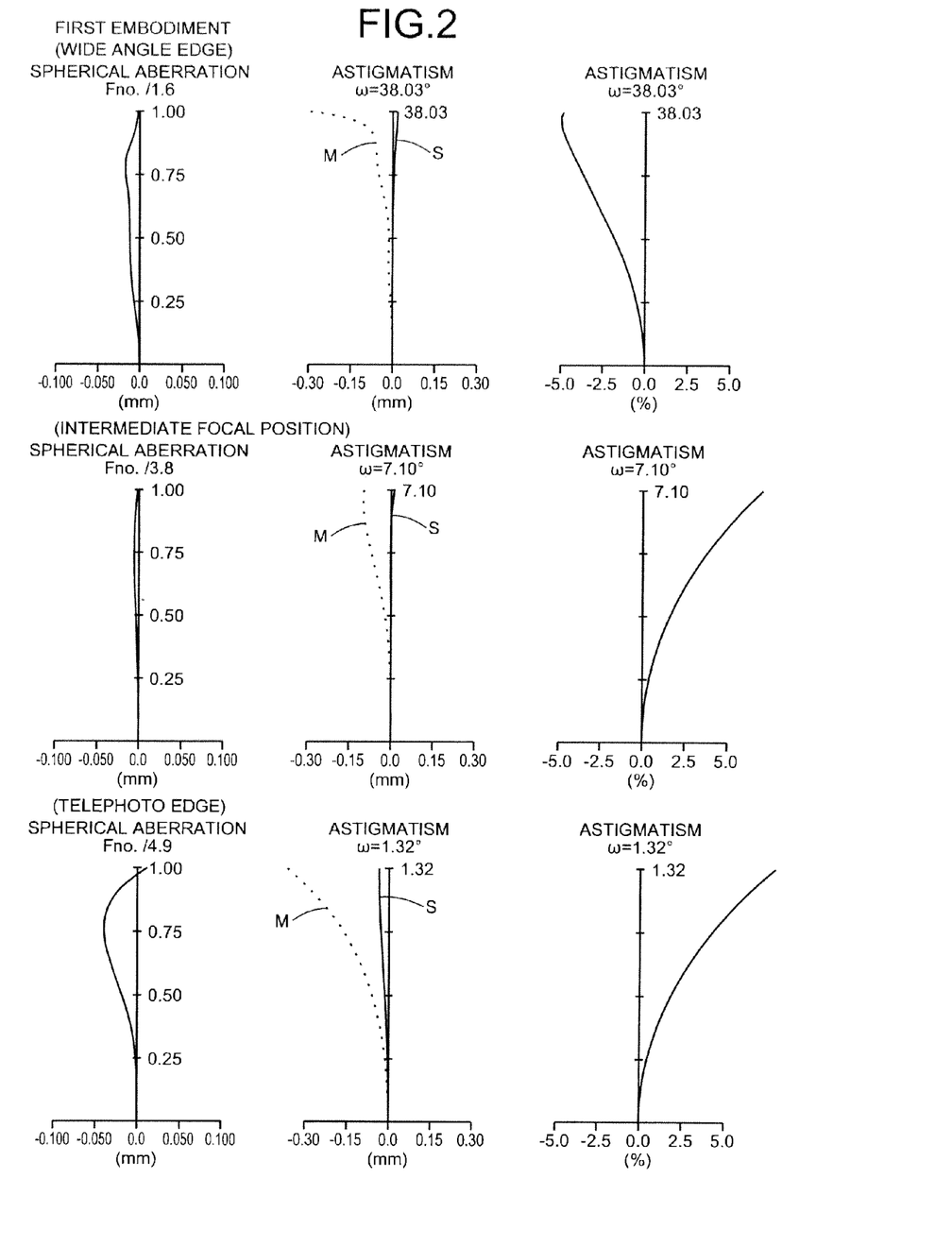
FIG. 2 is a diagram of various types of aberration occurring, with respect to the d-line, in the zoom lens according to the first embodiment.

FIG. 2 is a diagram of various types of aberration occurring, with respect to the d-line (λ=587.56 nm), in the zoom lens according to the first embodiment. S and M shown with respect to astigmatism, respectively indicate aberration at the sagittal image plane and at the meridonal image plane.

Figure 3:
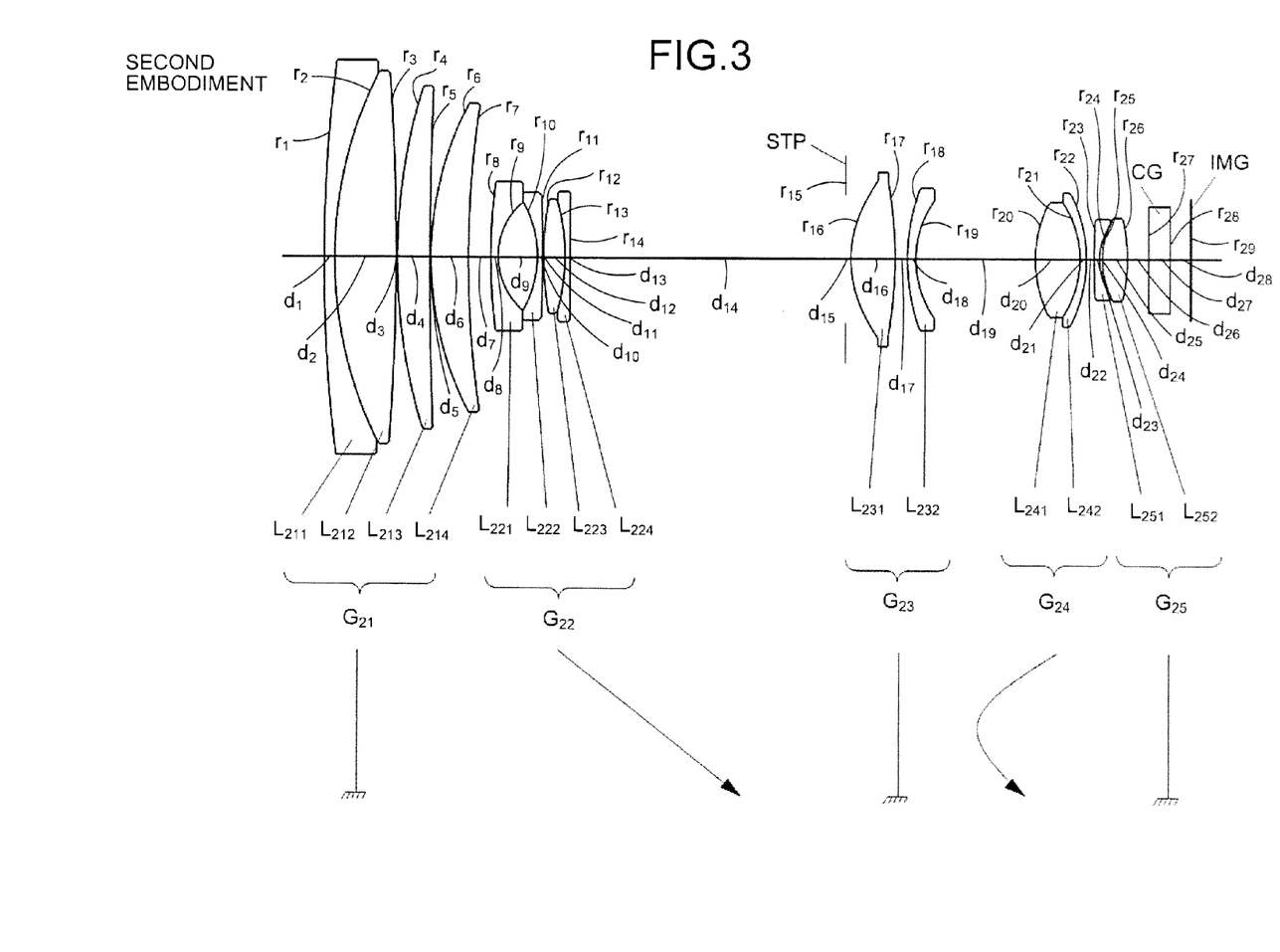
FIG. 3 is a cross sectional view (along the optical axis) of the zoom lens according to a second embodiment.

FIG. 3 is a cross sectional view (along the optical axis) of the zoom lens according to a second embodiment. The zoom lens includes sequentially from the object side, a first lens group $G_{21}$ having a positive refractive power, a second lens group $G_{22}$ having a negative refractive power, a third lens group $G_{23}$ having a positive refractive power, a fourth lens group $G_{24}$ having a positive refractive power, and a fifth lens group $G_{25}$ having a negative refractive power.

The aperture stop STP prescribing a given aperture is disposed between the second lens group $G_{22}$ and the third lens group $G_{23}$. The cover glass CG is disposed between the fifth lens group $G_{25}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{21}$ includes sequentially from the object side, a negative first lens $L_{211}$, a positive second lens $L_{212}$, a positive third lens $L_{213}$, and a positive fourth lens $L_{214}$. The first lens $L_{211}$ and the second lens $L_{212}$ are cemented.

The second lens group $G_{22}$ includes sequentially from the object side, a negative first lens $L_{221}$, a negative second lens $L_{222}$, a positive third lens $L_{223}$, and a negative fourth lens $L_{224}$. The first lens $L_{221}$ is a meniscus lens having a convex surface on the object side and both surfaces of the first lens $L_{221}$ are aspheric. The third lens $L_{223}$ and the fourth lens $L_{224}$ are cemented.

The third lens group $G_{23}$ includes sequentially from the object side, a positive first lens $L_{231}$ and a negative second lens $L_{232}$. Both surfaces of the first lens $L_{231}$ are aspheric. The second lens $L_{232}$ is a meniscus lens having a convex surface on the object side.

The fourth lens group $G_{24}$ includes sequentially from the object side, a positive first lens $L_{241}$ and a negative second lens $L_{242}$. The surface on the object side of the first lens $L_{241}$ is aspheric. The first lens $L_{241}$ and the second lens $L_{242}$ are cemented.

The fifth lens group $G_{25}$ includes sequentially from the object side, a negative first lens $L_{251}$ and a positive second lens $L_{252}$. Both surfaces of the first lens $L_{251}$ are aspheric.

The second lens group $G_{22}$ is moved along the optical axis from the object side toward the imaging plane IMG side, whereby the zoom lens zooms from the wide angle edge to the telephoto edge. The fourth lens group $G_{24}$ is moved along the optical axis, whereby the zoom lens corrects image plane variations accompanying zooming and performs focusing. The first lens group $G_{21}$, the third lens group $G_{23}$, and the fifth lens group $G_{25}$ remain stationary.

Here, various values related to the zoom lens according to the second embodiment are given.

Focal length of entire lens system = 4.3 (FW: wide angle edge) to 24.0 (intermediate focal position) to 129.0 (telephoto edge)
F number = 1.6 (wide angle edge) to 3.8 (intermediate focal position) to 4.9 (telephoto edge)
Half-angle (ω) = 38.09 (wide angle edge) to 7.07 (intermediate focal position) to 1.32 (telephoto edge)

(Lens Data)

| $r_1$ = 261.122 | $d_1$ = 1.00 | $nd_1$ = 1.84666 | $υd_1$ = 23.78 |
|---|---|---|---|
| $r_2$ = 41.992 | $d_2$ = 6.00 | $nd_2$ = 1.43700 | $υd_2$ = 95.10 |
| $r_3$ = −142.792 | $d_3$ = 0.10 |  |  |
| $r_4$ = 57.592 | $d_4$ = 3.34 | $nd_3$ = 1.61800 | $υd_3$ = 63.39 |
| $r_5$ = 1461.086 | $d_5$ = 0.10 |  |  |
| $r_6$ = 31.613 | $d_6$ = 3.50 | $nd_4$ = 1.88300 | $υd_4$ = 40.80 |
| $r_7$ = 91.274 | $d_7$ = D(7) | (variable) |  |
| $r_8$ = 17.271 (aspheric) | $d_8$ = 0.70 | $nd_5$ = 1.85135 | $υd_5$ = 40.10 |
| $r_9$ = 5.629 (aspheric) | $d_9$ = 3.82 |  |  |
| $r_{10}$ = −11.166 | $d_{10}$ = 0.50 | $nd_6$ = 1.88300 | $υd_6$ = 40.80 |
| $r_{11}$ = 67.816 | $d_{11}$ = 0.10 |  |  |
| $r_{12}$ = 19.434 | $d_{12}$ = 2.06 | $nd_7$ = 1.95906 | $υd_7$ = 17.47 |
| $r_{13}$ = −27.282 | $d_{13}$ = 0.50 | $nd_8$ = 1.88300 | $υd_8$ = 40.80 |
| $r_{14}$ = 63.676 | $d_{14}$ = D(14) | (variable) |  |
| $r_{15}$ = ∞ (aperture stop) | $d_{15}$ = 0.50 |  |  |
| $r_{16}$ = 11.267 (aspheric) | $d_{16}$ = 4.40 | $nd_9$ = 1.61881 | $υd_9$ = 63.85 |
| $r_{17}$ = −25.469 (aspheric) | $d_{17}$ = 0.10 |  |  |
| $r_{18}$ = 21.986 | $d_{18}$ = 0.60 | $nd_{10}$ = 2.001 | $υd_{10}$ = 29.13 |
| $r_{19}$ = 11.300 | $d_{19}$ = D(19) | (variable) |  |
| $r_{20}$ = 13.021 (aspheric) | $d_{20}$ = 4.18 | $nd_{11}$ = 1.4971 | $υd_{11}$ = 81.56 |
| $r_{21}$ = −10.019 | $d_{21}$ = 0.60 | $nd_{12}$ = 1.90366 | $υd_{12}$ = 31.31 |
| $r_{22}$ = −13.773 | $d_{22}$ = D(22) | (variable) |  |
| $r_{23}$ = 24.019 (aspheric) | $d_{23}$ = 0.50 | $nd_{13}$ = 1.85135 | $υd_{13}$ = 40.10 |
| $r_{24}$ = 5.699 (aspheric) | $d_{24}$ = 0.54 |  |  |
| $r_{25}$ = 16.318 | $d_{25}$ = 2.11 | $nd_{14}$ = 1.51633 | $υd_{14}$ = 64.14 |
| $r_{26}$ = −10.039 | $d_{26}$ = 1.00 |  |  |
| $r_{27}$ = ∞ | $d_{27}$ = 2.00 | $nd_{15}$ = 1.51633 | $υd_{15}$ = 64.14 |
| $r_{28}$ = ∞ | $d_{28}$ = 3.50 |  |  |
| $r_{29}$ = ∞ (imaging plane) |  |  |  |

Constants of the cone (k) and aspheric coefficients (A, B, C, D)

(eighth plane)

k = 0,
A = −6.21082 × 10$^{-4}$, B = 1.34413 × 10$^{-5}$,
C = −1.99187 × 10$^{-7}$, D = 1.35410 × 10$^{-9}$ (ninth plane)

k = −0.0060,
A = −7.63715 × 10$^{-4}$, B = −1.36437 × 10$^{-5}$,
C = 7.63607 × 10$^{-7}$, D = −2.94908 × 10$^{-8}$

-continued (sixteenth plane)

k = −0.2311,
A = −6.05478 × $10^{-5}$, B = −1.25340 × $10^{-6}$,
C = 1.67144 × $10^{-8}$, D = −8.95523 × $10^{-11}$
(seventeenth plane)

k = −4.7687,
A = 6.98644 × $10^{-5}$, B = −1.72352 × $10^{-6}$,
C = 2.91064 × $10^{-8}$, D = −1.70266 × $10^{-10}$
(twentieth plane)

k = −0.4887,
A = −7.75303 × $10^{-5}$, B = −4.64307 × $10^{-7}$,
C = −4.68979 × $10^{-11}$, D = 2.32383 × $10^{-10}$
(twenty-third plane)

k = 0,
A = −6.68416 × $10^{-4}$, B = −3.85322 × $10^{-5}$,
C = 7.43212 × $10^{-7}$, D = 6.05435 × $10^{-8}$
(twenty-fourth plane)

k = −0.2788,
A = −4.36169 × $10^{-4}$, B = −7.39966 × $10^{-5}$,
C = 1.04310 × $10^{-6}$, D = 8.94196 × $10^{-8}$ (Zoom Data)

| | wide angle edge | intermediate focal position | telephoto edge |
|---|---|---|---|
| D(7) | 0.600 | 19.459 | 27.778 |
| D(14) | 29.021 | 10.161 | 1.843 |
| D(19) | 9.668 | 4.480 | 13.573 |
| D(22) | 4.508 | 9.697 | 0.604 |

(Values related to conditional expression (1))
f21 (focal length of first lens $L_{221}$) = −10.088
|f21/FW| = 2.346
(Values related to conditional expression (2))
rp (radius of curvature of surface on image side of first lens $L_{221}$) = 5.629
|rp/f21| = 0.558
(Values related to conditional expression (3))
υd23 (Abbe number of third lens $L_{223}$, with respect to d-line) = 17.47
(Values related to conditional expression (4))
υd12 (Abbe number of second lens $L_{212}$, with respect to d-line) = 95.10
(Values related to conditional expression (5))
υd13 (Abbe number of third lens $L_{213}$, with respect to d-line) = 63.39

Figure 4:
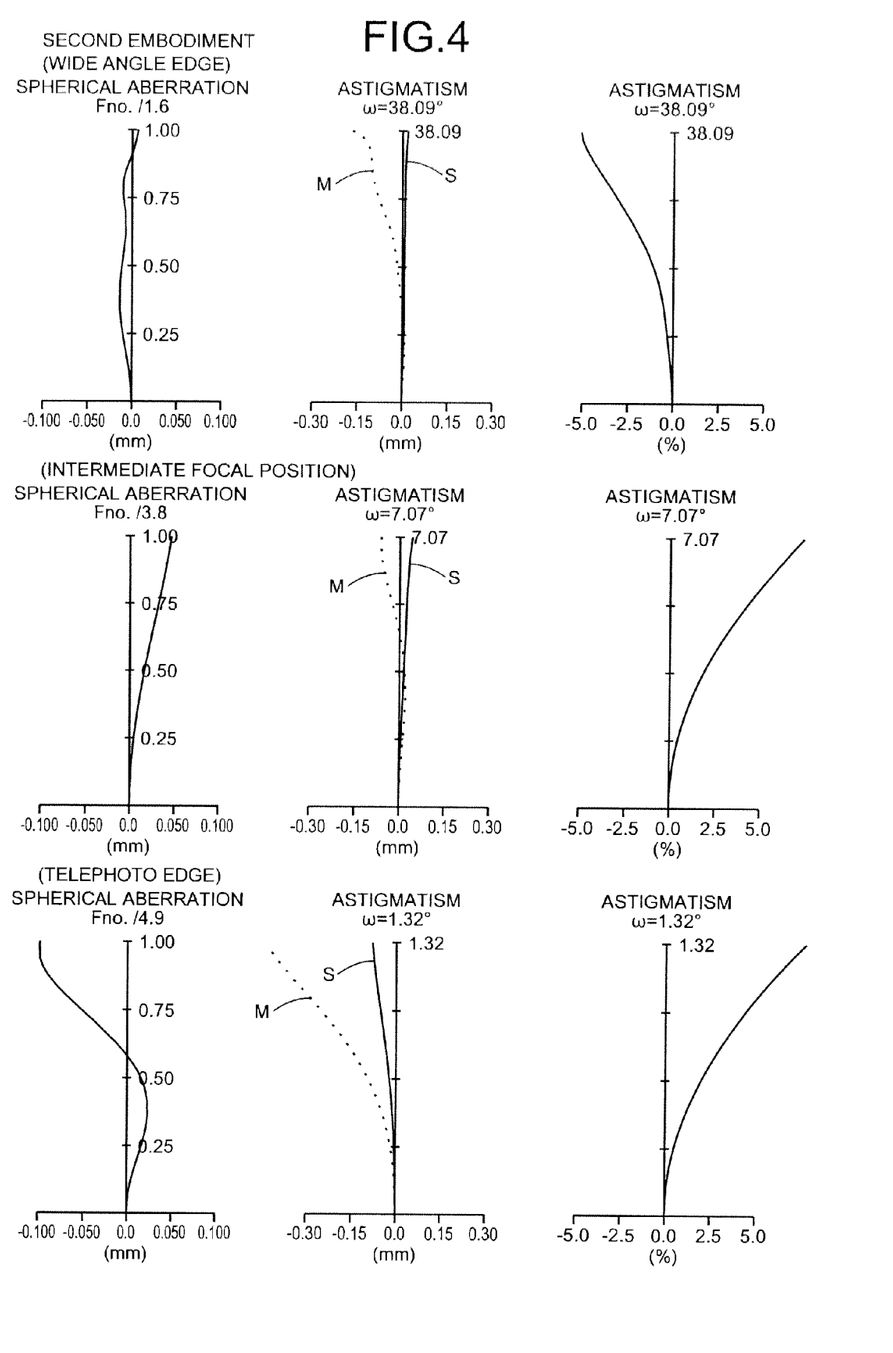
FIG. 4 is a diagram of various types of aberration occurring, with respect to the d-line, in the zoom lens according to the second embodiment.

FIG. 4 is a diagram of various types of aberration occurring, with respect to the d-line (λ=587.56 nm), in the zoom lens according to the second embodiment. S and M shown with respect to astigmatism, respectively indicate aberration at the sagittal image plane and at the meridonal image plane.

Figure 5:
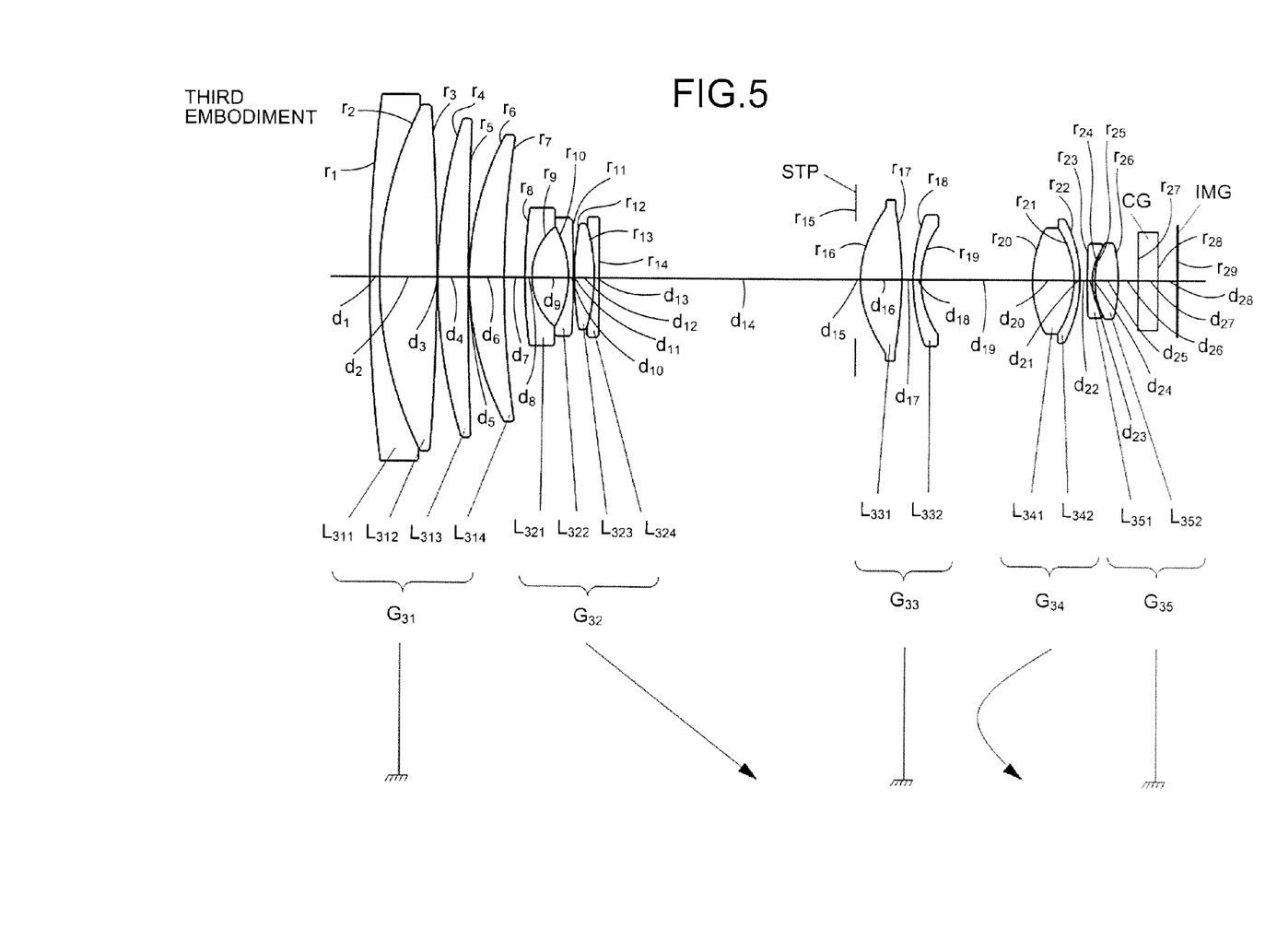
FIG. 5 is a cross sectional view (along the optical axis) of the zoom lens according to a third embodiment.

FIG. 5 is a cross sectional view (along the optical axis) of the zoom lens according to a third embodiment. The zoom lens includes sequentially from the object side, a first lens group $G_{31}$ having a positive refractive power, a second lens group $G_{32}$ having a negative refractive power, a third lens group $G_{33}$ having a positive refractive power, a fourth lens group $G_{34}$ having a positive refractive power, and a fifth lens group $G_{35}$ having a negative refractive power.

The aperture stop STP prescribing a given aperture is disposed between the second lens group $G_{32}$ and the third lens group $G_{33}$. The cover glass CG is disposed between the fifth lens group $G_{35}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{31}$ includes sequentially from the object side, a negative first lens $L_{311}$, a positive second lens $L_{312}$, a positive third lens $L_{313}$, and a positive fourth lens $L_{314}$. The first lens $L_{311}$ and the second lens $L_{312}$ are cemented.

The second lens group $G_{32}$ includes sequentially from the object side, a negative first lens $L_{321}$, a negative second lens $L_{322}$, a positive third lens $L_{323}$, and a negative fourth lens $L_{324}$. The first lens $L_{321}$ is a meniscus lens having a convex surface on the object side and both surfaces of the first lens $L_{321}$ are aspheric. The third lens $L_{323}$ and the fourth lens $L_{324}$ are cemented.

The third lens group $G_{33}$ includes sequentially from the object side, a positive first lens $L_{331}$ and a negative second lens $L_{332}$. Both surface of the first lens $L_{331}$ as aspheric. The second lens $L_{332}$ is a meniscus lens having a convex surface on the object side.

The fourth lens group $G_{34}$ includes sequentially from the object side, a positive first lens $L_{341}$ and a negative second lens $L_{342}$. The surface on the object side of the first lens $L_{341}$ is aspheric. The first lens $L_{341}$ and the second lens $L_{342}$ are cemented.

The fifth lens group $G_{35}$ includes sequentially from the object side, a negative first lens $L_{351}$ and a positive second lens $L_{352}$. Both surfaces of the first lens $L_{351}$ are aspheric.

The second lens group $G_{32}$ is moved along the optical axis from the object side toward the imaging plane IMG side, whereby the zoom lens zooms from the wide angle edge to the telephoto edge. The fourth lens group $G_{34}$ is moved along the optical axis, whereby the zoom lens corrects image plane variations accompanying zooming and performs focusing. The first lens group $G_{31}$, the third lens group $G_{33}$, and the fifth lens group $G_{35}$ remain stationary.

Here, various values related to the zoom lens according to the third embodiment are given.

Focal length of entire lens system = 4.3 (FW: wide angle edge) to 24.0 (intermediate focal position) to 129.0 (telephoto edge)
F number = 1.6 (wide angle edge) to 3.8 (intermediate focal position) to 4.9 (telephoto edge)
Half-angle (ω) = 37.93 (wide angle edge) to 7.09 (intermediate focal position) to 1.32 (telephoto edge)
(Lens Data)

| | | | |
|---|---|---|---|
| $r_1$ = 143.132 | $d_1$ = 1.00 | $nd_1$ = 1.84666 | $υd_1$ = 23.78 |
| $r_2$ = 40.225 | $d_2$ = 5.80 | $nd_2$ = 1.43700 | $υd_2$ = 95.10 |
| $r_3$ = −220.562 | $d_3$ = 0.10 | | |
| $r_4$ = 57.824 | $d_4$ = 3.28 | $nd_3$ = 1.59282 | $υd_3$ = 68.63 |
| $r_5$ = 575.311 | $d_5$ = 0.10 | | |
| $r_6$ = 32.258 | $d_6$ = 3.68 | $nd_4$ = 1.83481 | $υd_4$ = 42.72 |
| $r_7$ = 106.337 | $d_7$ = D(7) | (variable) | |
| $r_8$ = 53.938 (aspheric) | $d_8$ = 0.70 | $nd_5$ = 1.85135 | $υd_5$ = 40.10 |
| $r_9$ = 6.852 (aspheric) | $d_9$ = 3.63 | | |
| $r_{10}$ = −10.409 | $d_{10}$ = 0.50 | $nd_6$ = 1.88300 | $υd_6$ = 40.80 |
| $r_{11}$ = −119.311 | $d_{11}$ = 0.10 | | |
| $r_{12}$ = 32.375 | $d_{12}$ = 1.99 | $nd_7$ = 1.95906 | $υd_7$ = 17.47 |
| $r_{13}$ = −18.558 | $d_{13}$ = 0.50 | $nd_8$ = 1.88300 | $υd_8$ = 40.80 |
| $r_{14}$ = 246.052 | $d_{14}$ = D(14) | (variable) | |
| $r_{15}$ = ∞ (aperture stop) | $d_{15}$ = 0.50 | | |
| $r_{16}$ = 11.250 (aspheric) | $d_{16}$ = 4.50 | $nd_9$ = 1.61881 | $υd_9$ = 63.85 |
| $r_{17}$ = −25.151 (aspheric) | $d_{17}$ = 0.14 | | |
| $r_{18}$ = 25.680 | $d_{18}$ = 0.70 | $nd_{10}$ = 2.001 | $υd_{10}$ = 29.13 |
| $r_{19}$ = 12.179 | $d_{19}$ = D(19) | (variable) | |
| $r_{20}$ = 12.463 (aspheric) | $d_{20}$ = 4.21 | $nd_{11}$ = 1.4971 | $υd_{11}$ = 81.56 |
| $r_{21}$ = −10.285 | $d_{21}$ = 0.60 | $nd_{12}$ = 1.90366 | $υd_{12}$ = 31.31 |
| $r_{22}$ = −14.345 | $d_{22}$ = D(22) | (variable) | |
| $r_{23}$ = 34.622 (aspheric) | $d_{23}$ = 0.50 | $nd_{13}$ = 1.85135 | $υd_{13}$ = 40.10 |
| $r_{24}$ = 4.280 (aspheric) | $d_{24}$ = 0.11 | | |
| $r_{25}$ = 5.105 | $d_{25}$ = 2.54 | $nd_{14}$ = 1.54814 | $υd_{14}$ = 45.82 |
| $r_{26}$ = −18.427 | $d_{26}$ = 1.00 | | |
| $r_{27}$ = ∞ | $d_{27}$ = 2.00 | $nd_{15}$ = 1.51633 | $υd_{15}$ = 64.14 |
| $r_{28}$ = ∞ | $d_{28}$ = 3.50 | | |
| $r_{29}$ = ∞ (imaging plane) | | | |

-continued

Constants of the cone (k) and aspheric coefficients (A, B, C, D)

(eighth plane)

k = 0,
A = −1.10104 × 10⁻⁴, B = 6.86574 × 10⁻⁶,
C = −1.80314 × 10⁻⁷, D = 1.77529 × 10⁻⁹
(ninth plane)

k = 0.5559,
A = −3.93632 × 10⁻⁴, B = −6.30197 × 10⁻⁶,
C = 4.84720 × 10⁻⁷, D = −2.99161 × 10⁻⁸
(sixteenth plane)

k = −0.1935,
A = −5.34967 × 10⁻⁵, B = −1.15951 × 10⁻⁶,
C = 1.21900 × 10⁻⁸, D = −9.39982 × 10⁻¹¹
(seventeenth plane)

k = −6.7682,
A = 7.38246 × 10⁻⁵, B = −1.90295 × 10⁻⁶,
C = 2.73786 × 10⁻⁸, D = −1.67159 × 10⁻¹⁰
(twentieth plane)

k = −0.4009,
A = −6.89337 × 10⁻⁵, B = −1.52572 × 10⁻⁶,
C = 1.76743 × 10⁻⁸, D = 1.60421 × 10⁻¹⁰
(twenty-third plane)

k = 0,
A = −4.81453 × 10⁻⁴, B = −1.75639 × 10⁻⁵,
C = 1.83475 × 10⁻⁶, D = −9.28491 × 10⁻⁸
(twenty-fourth plane)

k = −0.2457,
A = −4.55109 × 10⁻⁴, B = −5.44365 × 10⁻⁵,
C = 3.09526 × 10⁻⁶, D = −2.17589 × 10⁻⁷

(Zoom Data)

|  | wide angle edge | intermediate focal position | telephoto edge |
|---|---|---|---|
| D(7) | 0.600 | 19.976 | 28.485 |
| D(14) | 29.696 | 10.320 | 1.811 |
| D(19) | 9.466 | 4.418 | 12.865 |
| D(22) | 4.116 | 9.164 | 0.717 |

(Values related to conditional expression (1))
f21 (focal length of first lens $L_{321}$) = −9.283
|f21/FW| = 2.159
(Values related to conditional expression (2))
rp (radius of curvature of surface on image side of first lens $L_{321}$) = 6.852
|rp/f21| = 0.738
(Values related to conditional expression (3))
υd23 (Abbe number of third lens $L_{323}$, with respect to d-line) = 17.47
(Values related to conditional expression (4))
υd12 (Abbe number of second lens $L_{312}$, with respect to d-line) = 95.10
(Values related to conditional expression (5))
υd13 (Abbe number of third lens $L_{313}$, with respect to d-line) = 68.63

Figure 6:
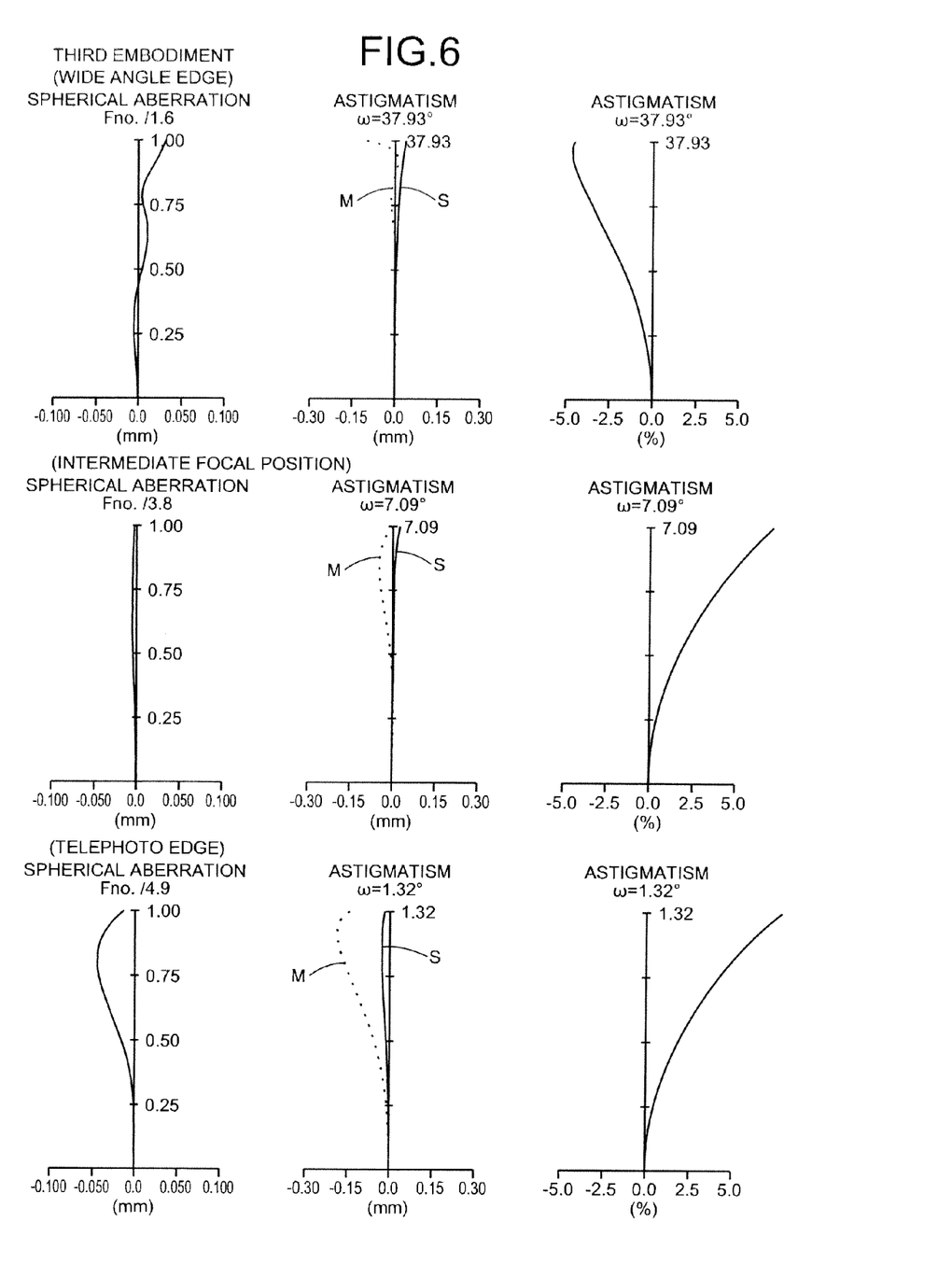
FIG. 6 is a diagram of various types of aberration occurring, with respect to the d-line, in the zoom lens according to the third embodiment.

FIG. 6 is a diagram of various types of aberration occurring, with respect to the d-line (λ=587.56 nm), in the zoom lens according to the third embodiment. S and M shown with respect to astigmatism, respectively indicate aberration at the sagittal image plane and at the moridonal image plane.

Figure 7:
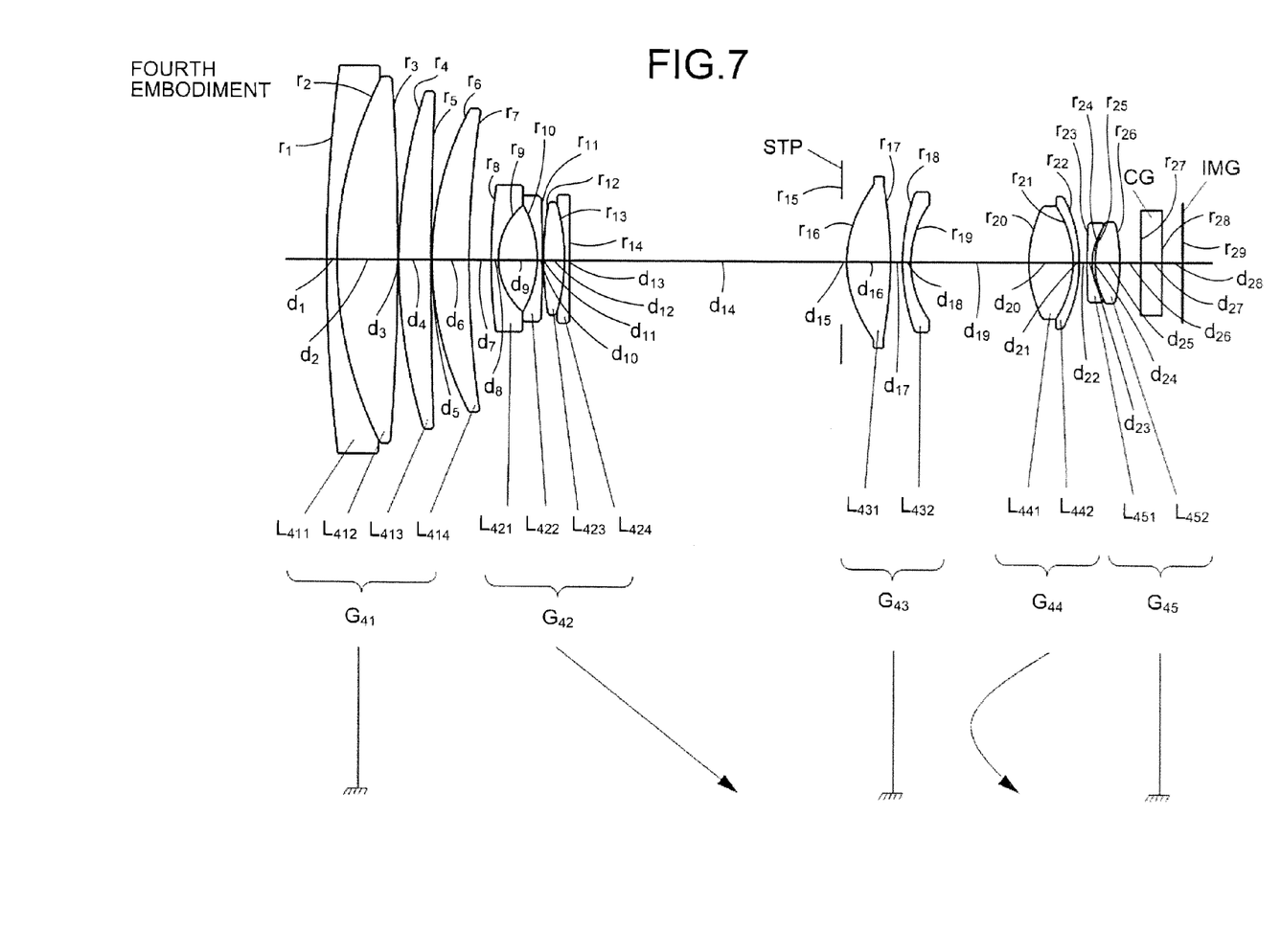
FIG. 7 is a cross sectional view (along the optical axis) of the zoom lens according to a fourth embodiment.

FIG. 7 is a cross sectional view (along the optical axis) of the zoom lens according to a fourth embodiment. The zoom lens includes sequentially from the object side, a first lens group $G_{41}$ having a positive refractive power, a second lens group $G_{42}$ having a negative refractive power, a third lens group $G_{43}$ having a positive refractive power, a fourth lens group $G_{44}$ having a positive refractive power, and a fifth lens group $G_{45}$ having a negative refractive power.

The aperture stop STP prescribing a given aperture is disposed between the second lens group $G_{42}$ and the third lens group $G_{43}$. The cover glass CG is disposed between the fifth lens group $G_{45}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{41}$ includes sequentially from the object side, a negative first lens $L_{411}$, a positive second lens $L_{412}$, a positive third lens $L_{413}$, and a positive fourth lens $L_{414}$. The first lens $L_{411}$ and the second lens $L_{412}$ are cemented.

The second lens group $G_{42}$ includes sequentially from the object side, a negative first lens $L_{423}$, a negative second lens $L_{422}$, a positive third lens $L_{423}$, and a negative fourth lens $L_{424}$. The first lens $L_{421}$ is a meniscus lens having a convex surface on the object side and both surfaces of the first lens $L_{421}$ are aspheric. The third lens $L_{423}$ and the fourth lens $L_{424}$ are cemented.

The third lens group $G_{43}$ includes sequentially from the object side, a positive first lens $L_{431}$ and a negative second lens $L_{432}$. Both surfaces of the first lens $L_{431}$ are aspheric. The second lens $L_{432}$ is a meniscus lens having a convex surface on the object side.

The fourth lens group $G_{44}$ includes sequentially from the object side, a positive first lens $L_{441}$ and a negative second lens $L_{442}$. The surface on the object side of the first lens $L_{441}$ is aspheric. The first lens $L_{441}$ and the second lens $L_{442}$ are cemented.

The fifth lens group $G_{45}$ includes sequentially from the object side, a negative first lens $L_{451}$ and a positive second lens $L_{452}$. Both surfaces of the first lens $L_{451}$ are aspheric.

The second lens group $G_{42}$ is moved along the optical axis from the object side toward the imaging plane IMG side, whereby the zoom lens zooms from the wide angle edge to the telephoto edge. The fourth lens group $G_{44}$ is moved along the optical axis, whereby the zoom lens corrects image plane variations accompanying zooming and performs focusing. The first lens group $G_{41}$, the third lens group $G_{43}$, and the fifth lens group $G_{45}$ remain stationary.

Here, various values related to the zoom lens according to the fourth embodiment are given.

Focal length of entire lens system = 4.3 (FW: wide angle edge) to 24.0 (intermediate focal position) to 129.0 (telephoto edge)
F number = 1.6 (wide angle edge) to 3.8 (intermediate focal position) to 4.9 (telephoto edge)
Half-angle (ω) = 38.01 (wide angle edge) to 7.10 (intermediate focal position) to 1.32 (telephoto edge)
(Lens Data)

| $r_1$ = 144.159 | $d_1$ = 1.00 | $nd_1$ = 1.84666 | $υd_1$ = 23.78 |
|---|---|---|---|
| $r_2$ = 38.899 | $d_2$ = 5.80 | $nd_2$ = 1.49700 | $υd_2$ = 81.60 |
| $r_3$ = −273.198 | $d_3$ = 0.10 | | |
| $r_4$ = 52.998 | $d_4$ = 3.31 | $nd_3$ = 1.59282 | $υd_3$ = 68.63 |
| $r_5$ = 378.875 | $d_5$ = 0.10 | | |
| $r_6$ = 31.113 | $d_6$ = 3.57 | $nd_4$ = 1.83481 | $υd_4$ = 42.72 |
| $r_7$ = 92.838 | $d_7$ = D(7) (variable) | | |
| $r_8$ = 76.499 (aspheric) | $d_8$ = 0.70 | $nd_5$ = 1.85135 | $υd_5$ = 40.10 |
| $r_9$ = 6.041 (aspheric) | $d_9$ = 3.30 | | |
| $r_{10}$ = −12.953 | $d_{10}$ = 0.50 | $nd_6$ = 1.88300 | $υd_6$ = 40.80 |
| $r_{11}$ = 71.416 | $d_{11}$ = 0.10 | | |
| $r_{12}$ = 18.115 | $d_{12}$ = 1.99 | $nd_7$ = 1.94594 | $υd_7$ = 17.98 |
| $r_{13}$ = −26.555 | $d_{13}$ = 0.50 | $nd_8$ = 1.88300 | $υd_8$ = 40.80 |
| $r_{14}$ = 95.601 | $d_{14}$ = D(14) (variable) | | |
| $r_{15}$ = ∞ (aperture stop) | $d_{15}$ = 0.50 | | |
| $r_{16}$ = 11.217 (aspheric) | $d_{16}$ = 4.40 | $nd_9$ = 1.61881 | $υd_9$ = 63.85 |
| $r_{17}$ = −25.000 (aspheric) | $d_{17}$ = 0.96 | | |
| $r_{18}$ = 22.880 | $d_{18}$ = 0.60 | $nd_{10}$ = 2.001 | $υd_{10}$ = 29.13 |

-continued

| | | | |
|---|---|---|---|
| $r_{19}$ = 10.741 | $d_{19}$ = D(19) | (variable) | |
| $r_{20}$ = 11.970 (aspheric) | $d_{20}$ = 4.20 | $nd_{11}$ = 1.4971 | $\upsilon d_{11}$ = 81.56 |
| $r_{21}$ = −9.300 | $d_{21}$ = 0.60 | $nd_{12}$ = 1.90366 | $\upsilon d_{12}$ = 31.31 |
| $r_{22}$ = −13.445 | $d_{22}$ = D(22) | (variable) | |
| $r_{23}$ = 41.730 (aspheric) | $d_{23}$ = 0.50 | $nd_{13}$ = 1.85135 | $\upsilon d_{13}$ = 40.10 |
| $r_{24}$ = 6.749 (aspheric) | $d_{24}$ = 0.49 | | |
| $r_{25}$ = 17.244 | $d_{25}$ = 2.13 | $nd_{14}$ = 1.56732 | $\upsilon d_{14}$ = 42.80 |
| $r_{26}$ = −10.867 | $d_{26}$ = 1.00 | | |
| $r_{27}$ = ∞ | $d_{27}$ = 2.00 | $nd_{15}$ = 1.51633 | $\upsilon d_{15}$ = 64.14 |
| $r_{28}$ = ∞ | $d_{28}$ = 3.50 | | |
| $r_{29}$ = ∞ (imaging plane) | | | |

Constants of the cone (k) and aspheric coefficients (A, B, C, D)

(eighth plane)

k = 0,
A = −2.65503 × 10$^{-4}$, B = 1.28344 × 10$^{-5}$,
C = −3.59136 × 10$^{-7}$, D = 3.83400 × 10$^{-9}$ (ninth plane)

k = 0.3239,
A = −5.45623 × 10$^{-4}$, B = −7.61065 × 10$^{-6}$,
C = 7.83466 × 10$^{-7}$, D = −5.46724 × 10$^{-8}$ (sixteenth plane)

k = −0.1982,
A = −5.20814 × 10$^{-5}$, B = −1.30668 × 10$^{-6}$,
C = 1.67967 × 10$^{-8}$, D = −1.13589 × 10$^{-10}$ (seventeenth plane)

k = −6.0844,
A = −7.14760 × 10$^{-5}$, B = −1.84345 × 10$^{-6}$,
C = 2.96044 × 10$^{-8}$, D = −1.85685 × 10$^{-10}$ (twentieth plane)

k = −0.2645,
A = −5.95055 × 10$^{-5}$, B = −1.16644 × 10$^{-6}$,
C = 7.95351 × 10$^{-9}$, D = 3.24336 × 10$^{-10}$ (twenty-third plane)

k = 0,
A = −3.71965 × 10$^{-4}$, B = −2.63704 × 10$^{-5}$,
C = 2.26085 × 10$^{-6}$, D = −6.30326 × 10$^{-8}$ (twenty-fourth plane)

k = 0.0775,
A = −2.57754 × 10$^{-4}$, B = −3.45586 × 10$^{-5}$,
C = 9.86053 × 10$^{-7}$, D = 3.54356 × 10$^{-10}$ (Zoom Data)

| | wide angle edge | intermediate focal position | telephoto edge |
|---|---|---|---|
| D(7) | 0.897 | 19.167 | 27.163 |
| D(14) | 28.094 | 9.824 | 1.828 |
| D(19) | 10.148 | 4.496 | 14.112 |
| D(22) | 4.564 | 10.216 | 0.600 |

(Values related to conditional expression (1))
f21 (focal length of first lens $L_{421}$) = −7.740
|f21/FW| = 1.8
(Values related to conditional expression (2))
rp (radius of curvature of surface on image side of first lens $L_{421}$) = 6.041
|rp/f21| = 0.781
(Values related to conditional expression (3))
υd23 (Abbe number of third lens $L_{423}$, with respect to d-line) = 17.98
(Values related to conditional expression (4))
υd12 (Abbe number of second lens $L_{412}$, with respect to d-line) = 81.60
(Values related to conditional expression (5))
υd13 (Abbe number of third lens $L_{413}$, with respect to d-line) = 68.63

Figure 8:
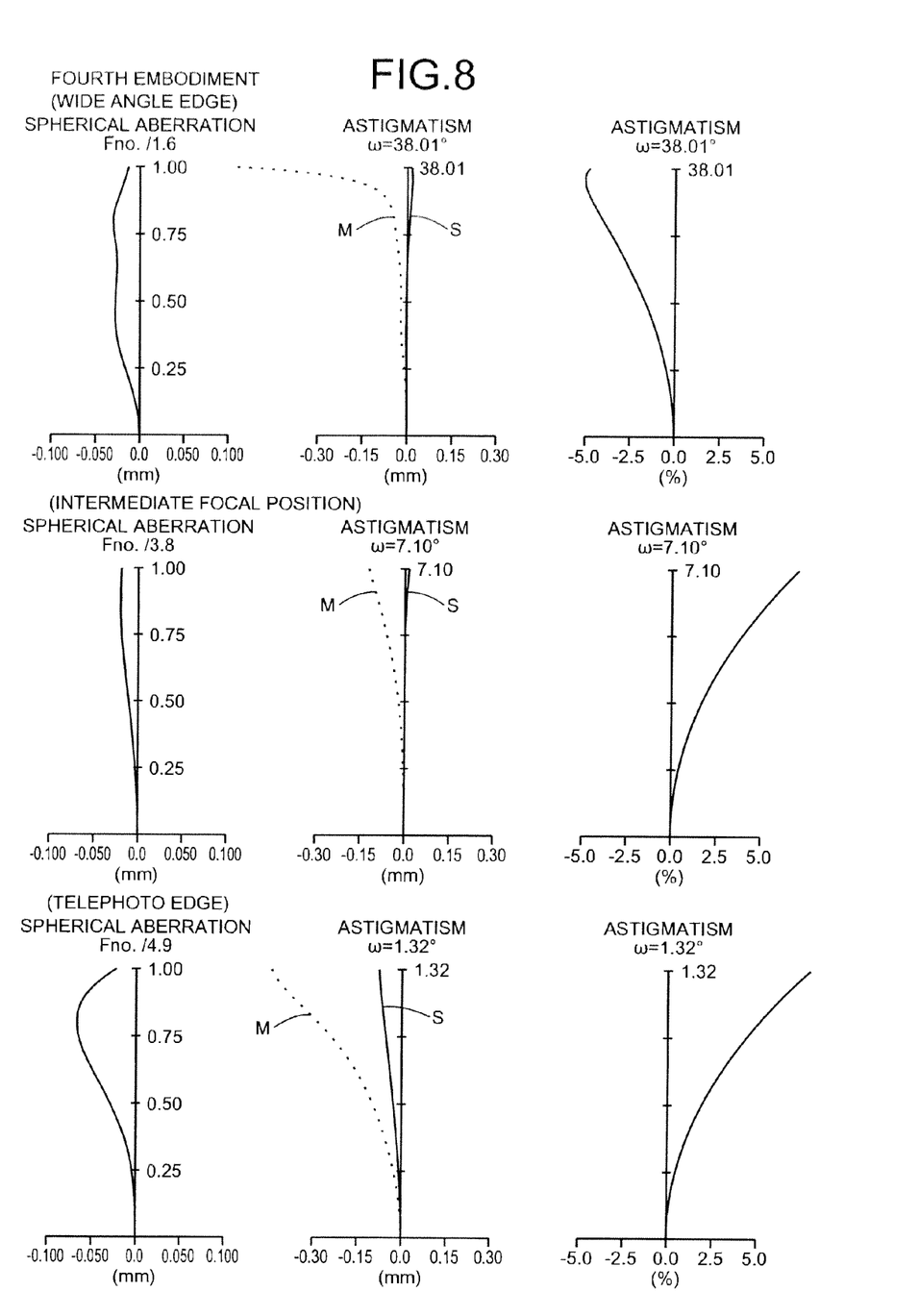
FIG. 8 is a diagram of various types of aberration occurring, with respect to the d-line, in the zoom lens according to the fourth embodiment.

FIG. 8 is a diagram of various types of aberration occurring, with respect to the d-line (λ=587.56 nm), in the zoom lens according to the fourth embodiment. S and M shown with respect to astigmatism, respectively indicate aberration at the sagittal image plane and at the meridonal image plane.

Among the values for each of the embodiments, $r_1, r_2, \ldots$ indicate radii of curvature for each lens, aperture stop surface, etc.; $d_1, d_2, \ldots$ indicate the thickness of the lenses, aperture stop, etc. or the distance between surfaces thereof; $nd_1, nd_2, \ldots$ indicate the refraction index of each lens with respect to the d-line (λ=587.56 nm); and $\upsilon d_1, \upsilon d_2, \ldots$ indicate the Abbe number of each lens with respect to the d-line (λ=587.56 nm). Lengths are indicated in units of [mm] and angles are indicated in [degrees].

Each of the aspheric surfaces above is expressed by the following equation, where Z is the depth of the aspheric surface, R is the paraxial radius of curvature, h is the height from the optical axis, and the traveling direction of light is positive.

$$Z = \frac{y^2}{R\{1 + 1\sqrt{1 - (1+k)y/R^2}\}^2} + Ay^4 + By^6 + Cy^8 + Dy^{10} \quad [1]$$

Further, k is the constant of the cone, and A, B, C, and D are the fourth, the sixth, the eighth, and the tenth order aspheric coefficients, respectively.

As described, the zoom lens of each of the embodiments includes lenses having suitable aspheric surfaces and cemented lenses and by satisfying the conditional expressions above, achieves wide angle views of 75 degrees or more and a large aperture ratio of an F number on the order of 1.6, and can implement an imaging lens that is compact and has high optical performance as well as a high zoom ratio (on the order of 30×) and that is suitable for compact imaging apparatuses equipped with a full high vision solid state image sensors.

As described, the zoom lens according to the present invention is useful for compact imaging apparatuses equipped with a solid state image sensor, such as a digital still camera and a digital video camera. In particular, the zoom lens is optimal for a surveillance camera equipped with a full high vision solid state image sensor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2012-042553 filed in Japan on Feb. 28, 2012.

What is claimed is:

1. A zoom lens comprises sequentially from an object side, a first lens group having a positive refractive power, a second lens group having a negative refractive power, a third lens group having a positive refractive power, a fourth lens group having a positive refractive power, and a fifth lens group having a negative refractive power, wherein
the first lens group, the third lens group, and the fifth lens group remain stationary,
the second lens group is moved along an optical axis, from the object side toward an image side, whereby zooming from a wide angle edge to a telephoto edge is performed,
the fourth lens group is moved along the optical axis, whereby image plane variation accompanying zooming is corrected and focusing is performed, the second lens group includes sequentially from the object side, a first lens that is a negative meniscus lens having a convex surface on the object side and having at least one aspheric surface, a negative second lens, a positive third lens, and a negative fourth lens, and the zoom lens satisfies:

a conditional expression (1) $1.5<|f21/FW|<2.5$, and a conditional expression (2) $0.5<|rp/f21|<0.8$, where, f21 is a focal length of the first lens in the second lens group, FW is a focal length of the entire optical system at the wide angle edge, and rp is a radius of curvature of a surface on the image side of the first lens of the second lens group.

2. The zoom lens according to claim 1, wherein the third lens and the fourth lens in the second lens group are cemented, and the zoom lens satisfies a conditional expression (3) $vd23<20$, where, υd23 is an Abbe number, with respect to d-line, of the third lens in the second lens group.

3. The zoom lens according to claim 1, wherein the first lens group includes sequentially from the object side, a negative first lens, a positive second lens, a positive third lens, and a positive fourth lens, the first lens and the second lens in the first lens group are cemented, and the zoom lens satisfies:

a conditional expression (4) $vd12>75$, and a conditional expression (5) $vd13>63$, where, υd12 is an Abbe number, with respect to the d-line, of the second lens in the first lens group, υd13 is an Abbe number, with respect to the d-line, of the third lens in the first lens group.

4. The zoom lens according to claim 1, wherein the third lens group includes sequentially from the object side, a positive first lens having at least one aspheric surface and a negative second lens that is a meniscus lens having a convex surface on the object side.

5. The zoom lens according to claim 2, wherein the third lens group includes sequentially from the object side, a positive first lens having at least one aspheric surface and a negative second lens that is a meniscus lens having a convex surface on the object side.

* * * * *